US006729445B1

(12) United States Patent
Qian et al.

(10) Patent No.: US 6,729,445 B1
(45) Date of Patent: May 4, 2004

(54) PISTON HAVING A CAP AND A BRAKE CALIPER FOR USE THEREWITH

(75) Inventors: Wenqi Qian, Fort Mill, SC (US); Grafton Robertson, Gaffney, SC (US)

(73) Assignee: Performance Friction Corporation, Clover, SC (US)

( * ) Notice: Subject to any disclaimer, the term of this patent is extended or adjusted under 35 U.S.C. 154(b) by 0 days.

(21) Appl. No.: 10/347,697

(22) Filed: Jan. 22, 2003

Related U.S. Application Data

(60) Provisional application No. 60/426,451, filed on Nov. 15, 2002.

(51) Int. Cl.[7] ............................................. F16D 65/847
(52) U.S. Cl. ................................................. 188/264 G
(58) Field of Search ........................ 188/264 B, 264 G; 92/129

(56) References Cited

U.S. PATENT DOCUMENTS

| 3,502,004 | A | * | 3/1970 | Schrader ................. 188/264 G |
| 4,147,241 | A | * | 4/1979 | Preniczny et al. ...... 188/264 G |
| 4,798,270 | A | * | 1/1989 | Schneider et al. ...... 188/264 G |
| 6,446,767 | B1 | * | 9/2002 | Gonzalez et al. .......... 188/71.6 |

* cited by examiner

*Primary Examiner*—Christopher P. Schwartz
(74) *Attorney, Agent, or Firm*—Pillsbury Winthrop LLP

(57) ABSTRACT

A brake caliper has a piston retained in a bore that abuts a brake pad for moving the brake pad into selective engagement with a rotor to effect braking. The piston has a composite cap that is formed of a cap piece made of strong material, such as steel, and an insulator, made of polyimide resin material, for example. The insulator is preferably in the form of a ring clamped between the cap piece and the piston to create a thermal break and minimize heat transfer from the brake pad to the piston and caliper assembly.

27 Claims, 19 Drawing Sheets

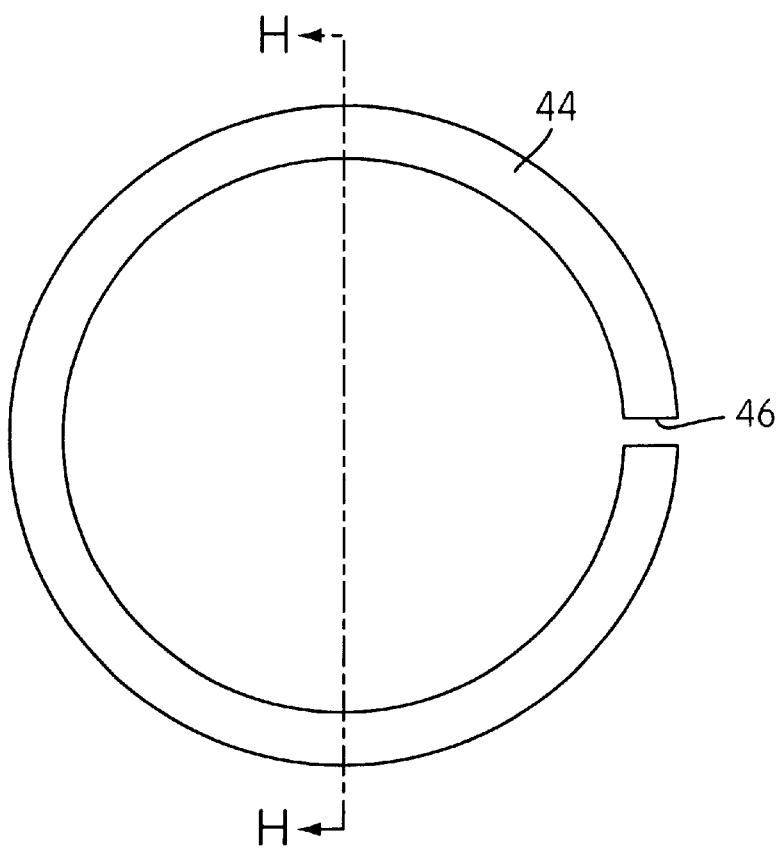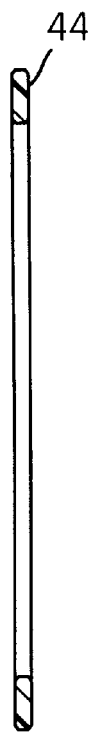
FIG. 11A
FIG. 11B

PISTON HAVING A CAP AND A BRAKE CALIPER FOR USE THEREWITH

This application claims priority to U.S. Provisional Application Ser. No. 60/426,451 filed Nov. 15, 2002, the contents of which are incorporated herein in their entirety.

BACKGROUND OF THE INVENTION

1. Field of the Invention

This invention relates to brake calipers for use with disc brakes. In particular, the invention relates to pistons used in brake calipers.

2. Discussion of Related Art

In typical disc brake assemblies, a rotor is mounted on a wheel hub for rotation. One or more pairs of brake pads, generally designed as friction material carried on a backing plate, are supported on either side of the rotor by a caliper or an anchor bracket. Calipers are designed to apply the braking force by moving a piston relative to the rotor to thereby move the brake pad into and out of contact with the rotor. The pistons are supported in a bore and abut the backing plate of the brake pad to move the brake pad toward the rotor upon application of a braking force. The caliper can be hydraulically actuated, for example, to selectively press the brake pads against the surface of the rotor to stop the rotation of the rotor and hence the wheel hub by forcing hydraulic brake fluid into the piston bore.

The piston bore has an annular seal retained in the bore that seals the brake fluid in the bore and causes the piston to retract into the bore after the braking force is removed. The seal is compressed by the piston. So, when the piston is forced out of the bore toward the rotor by the brake fluid, the seal is pulled with the piston. When the braking force is removed, the seal tends to roll back into the bore pulling the piston with it.

Pistons are often made of lightweight material. As the braking force applied by the piston to the brake pad can be large, piston caps are often used on the piston surface that abuts the backing plate of the brake pad to strengthen the piston and increase its durability. The caps are generally a hard material, such as steel. However, a great deal of heat is transferred through the cap. One way of reducing the heat transfer is to use a stainless steel cap or titanium cap.

Upon application of the brake pads to the braking surface of the rotor, friction generated between the brake pad and the braking surface slows rotation of the rotor. This generates heat that is transferred from the brake pad through the backing plate to the piston and caliper assembly. Pistons that have stainless steel caps can transfer as much as 4–5 watts/minute/degrees Kelvin (W/min/° K.) to the piston and caliper. The amount of heat generated can vary, but is often extreme in high performance applications, such as in racing vehicles, heavy duty vehicles, and other extreme situations. Thus, even with the use of a stainless steel cap, too much heat is transferred to the caliper.

The high heat generated during braking has several adverse effects to the caliper assembly. First, the piston seal typically only has an operating range up to 300° F. When the heat generated during braking exceeds that temperature, the seal can become degraded and crack or lose its elasticity. When the seal does not function properly, brake fluid can leak from the bore, which causes the brake to malfunction. The loss of elasticity prevents the seal from pulling the piston back into the bore, which causes the brake pad to continue to rub on the rotor surface. This condition is called "drag" and will slow the vehicle, create excessive wear on the rotors and pads, generate additional heat, and adversely affect fuel economy.

Second, heat affects the brake fluid in the caliper assembly. If heat is transferred to the piston and hence the brake fluid surrounding the piston, the brake fluid can be heated to the point of boiling. Once the brake fluid boils, the fluid is no longer incompressible. As a result, braking is more difficult or can not be accomplished at all. This effect causes a condition often termed "long pedal" in which a longer pedal stroke is required to cause the piston to actuate the brake pad.

Third, increased temperature affects the caliper itself It is preferred that the caliper be as stiff as possible to securely and uniformly hold the pistons in position for braking. Many calipers are formed of aluminum for its lightweight strength. However, aluminum functions best at temperatures below 350° F., with the stiffness dropping considerably at higher temperatures. These higher temperatures will cause more deflection of the caliper, which in turn leads to increased brake fluid disbursement. As a result, the driver will experience a long pedal.

Thus, there is a need for an insulated assembly that reduces heat transfer from the brake pad to the caliper assembly.

SUMMARY OF THE INVENTION

An aspect of embodiments of the invention is to provide a caliper assembly with insulating characteristics.

Another aspect of embodiments of the invention is to provide a caliper assembly with a piston having an insulating cap.

A further aspect of embodiments of the invention is to provide a caliper assembly having a piston that includes a high performance polymer insulator, such as a polyimide resin.

These and other aspects of the invention can be realized by embodiments of the invention in which a piston is provided for use with a brake caliper, the piston comprising a piston body, a cap piece secured to an end of the piston body, and an insulator having low thermal conductivity disposed between the cap piece and the piston body.

The invention is also directed to a brake caliper comprising a caliper body configured to surround an edge of a rotor, wherein the caliper body includes at least one bore, a piston slidably retained in the bore and having an end protruding from the bore, and a composite cap secured to the end of the piston. The cap includes a cap piece having an attachment element that couples the cap piece to the piston and an insulator disposed between the cap piece and the piston.

The invention is additionally directed to a disc brake assembly comprising a rotor including a disc and an attachment portion that is configured for attachment to a wheel hub, at least one pail of brake pads mounted adjacent to the caliper on either side of the rotor for selective engagement with the rotor, and a brake caliper mounted adjacent to the rotor so as to surround an edge of the rotor. The brake caliper includes at least one piston slidably mounted adjacent the brake pads to selectively actuate movement of the brake pads toward the rotor. Each piston has a piston cap having a metallic cap piece and an thermal insulator disposed between the cap piece and the piston. The disc brake can be combined with a vehicle.

BRIEF DESCRIPTION OF THE DRAWINGS

FIG. 11A is a top view of a modification of the seal; G—G;

FIG. 11B is a side view in cross section of the seal of FIG. 11A taken along line H—H;

DETAILED DESCRIPTION OF PREFERRED EMBODIMENTS

This invention is described for use in a vehicular disc brake system. The rotor described below is used for illustrative purposes only and it will be understood that this invention may be used in various types of braking systems and with any rotor.

Figure 1:
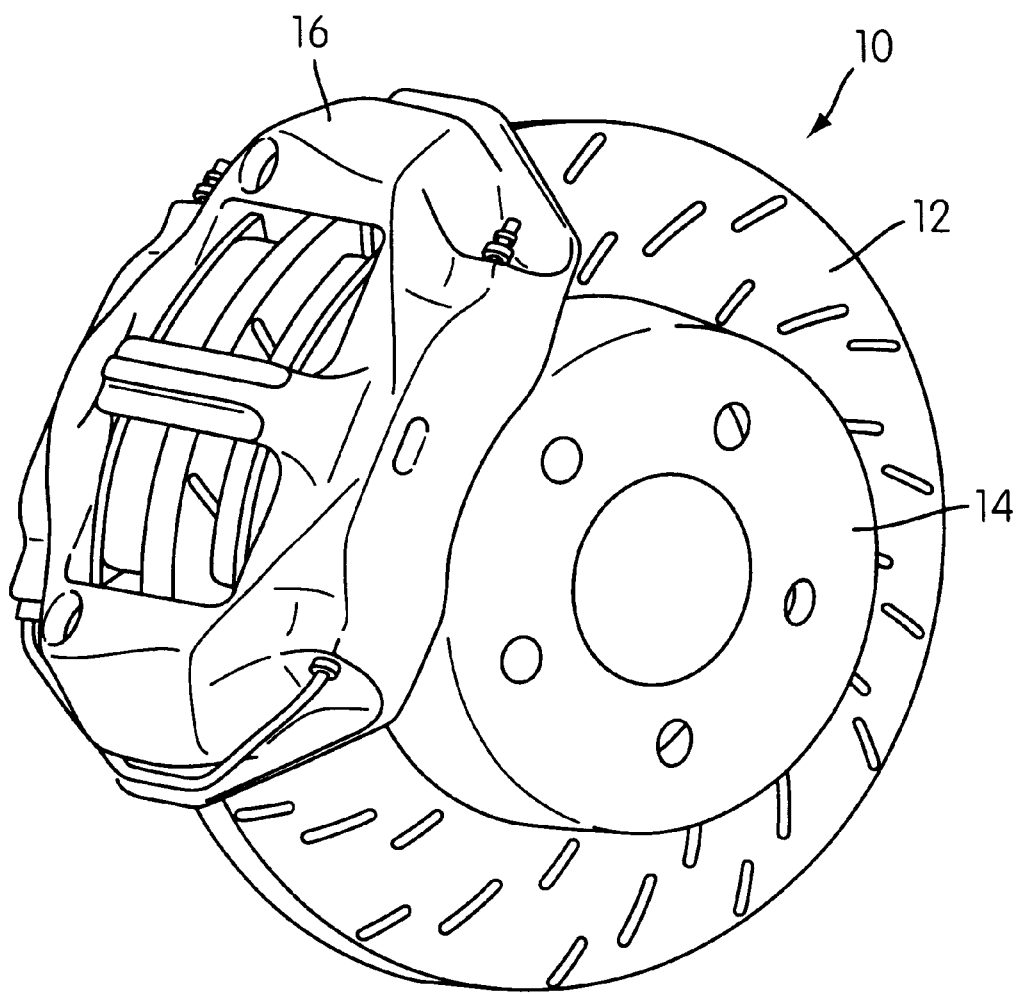
FIG. 1 is a side perspective view of a brake rotor with a caliper assembly.
Figure 2:
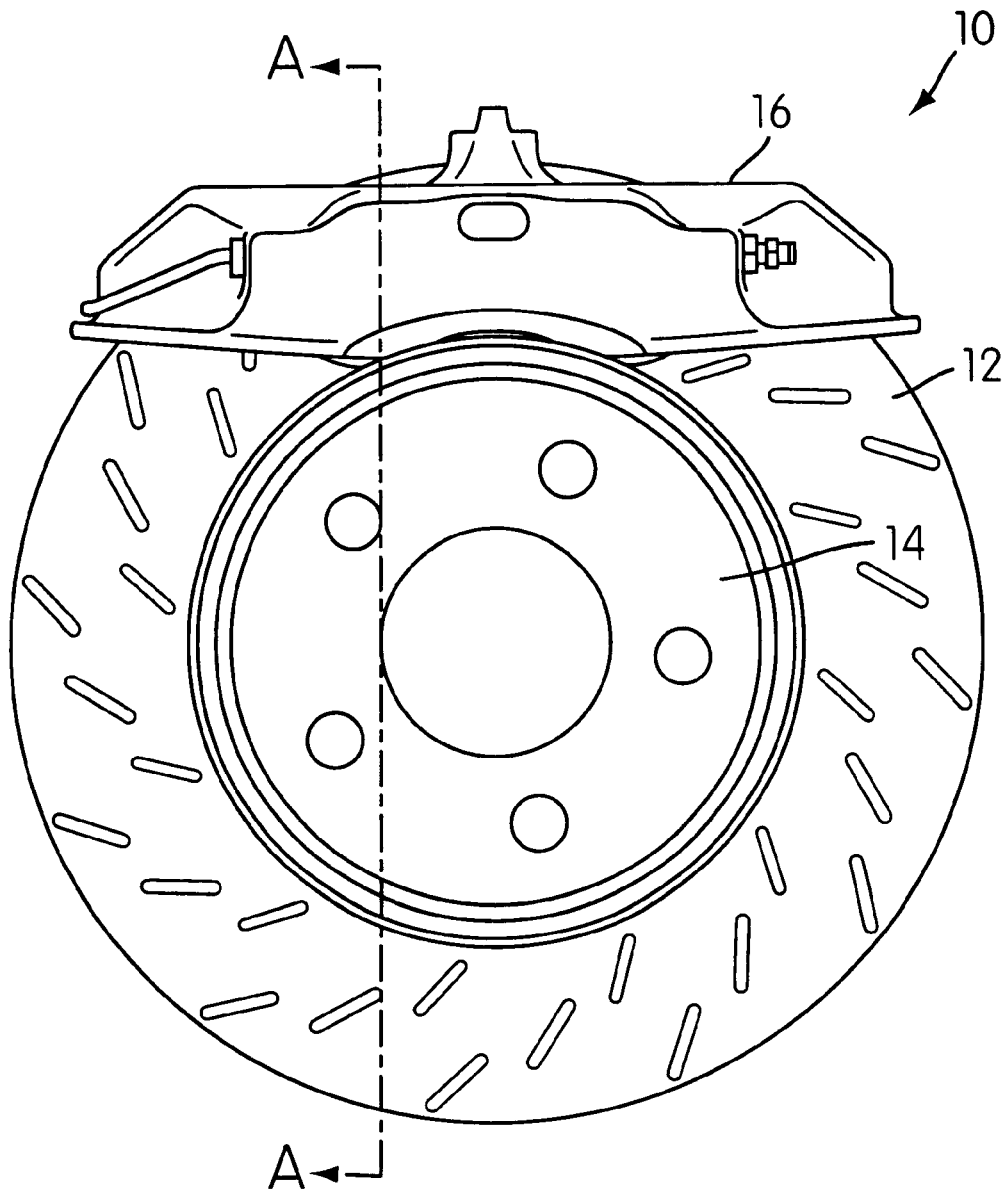
FIG. 2 is a side perspective view of the brake rotor and caliper assembly of FIG. 1.

Referring to FIGS. 1 and 2, a brake system 10 is shown including a rotor 12 with a hat 14 for attachment to a wheel hub. A caliper assembly 16 is mounted over one side of the rotor 12. The caliper assembly 16 can be mounted in any position with respect to the rotor 12 depending on the desired application. For example, the caliper assembly 16 is preferably mounted on the leading or trailing edge of the rotor 12. While the rotor 12 is shown as a ventilated disc with grooves on its surface and a hat 14 attached thereto, as noted above, any type of rotor may be used with this invention. Further, this invention is suitable for various types of calipers, such as fixed calipers and floating calipers. A fixed caliper has one or more pistons on each side, while floating caliper has one or more pistons on only one side.

Figure 3:
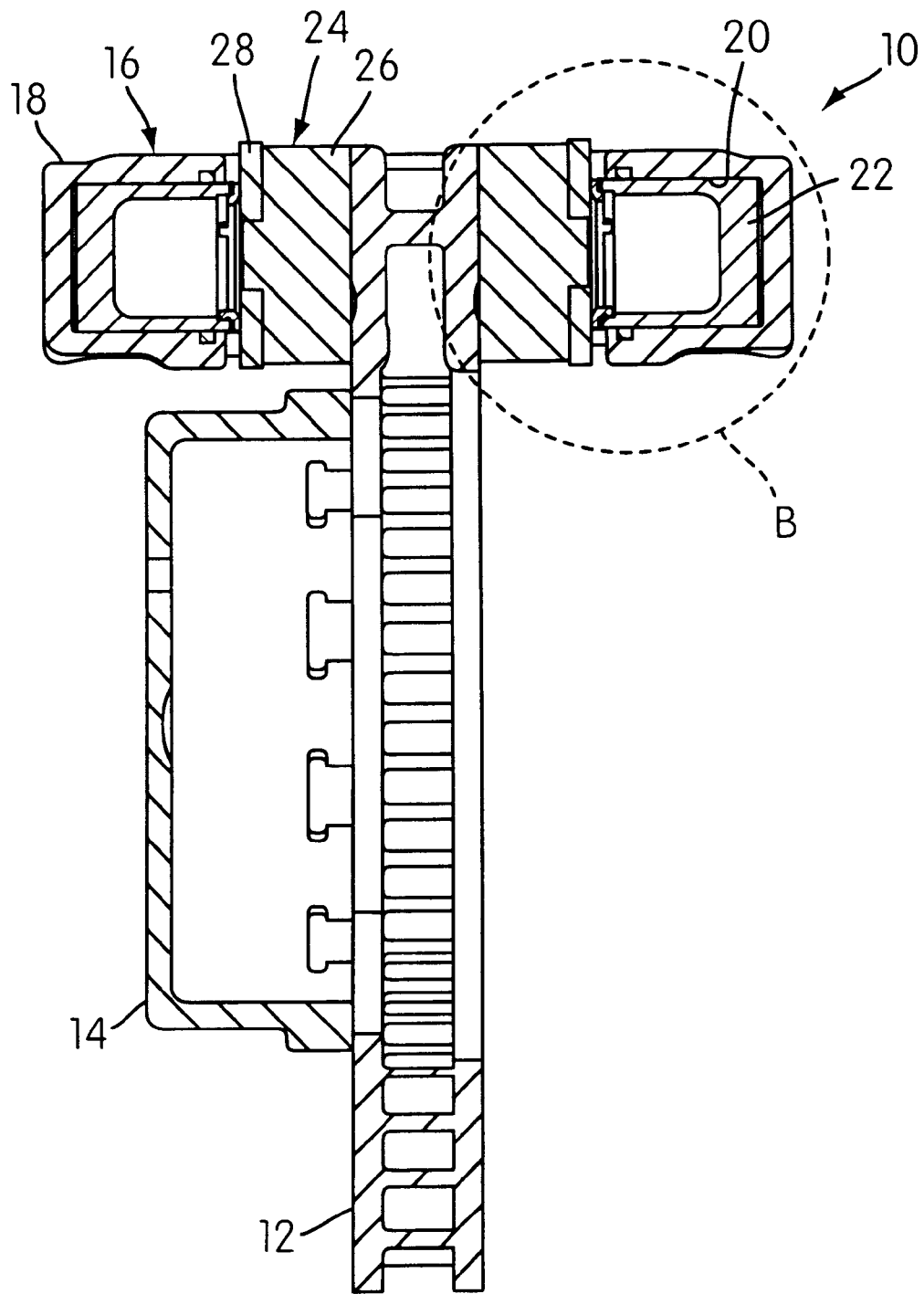
FIG. 3 is a side view in cross section of the brake rotor and caliper assembly of FIG. 2 taken along line A—A.

As seen in FIG. 3, the caliper assembly 16 is a fixed caliper and includes a caliper body 18, preferably formed of aluminum, that surrounds an edge of the rotor 12. Each side of the caliper body 18 is the same, and for purposes of simplicity only one side is described in detail. Of course, other types of caliper designs may be used, including a floating caliper. At least one piston bore 20 is formed on each side, and a piston 22 is retained in each bore 20. A pair of brake pads 24 are mounted against each piston 22 on either side of the rotor 12. Additionally, multiple pairs of brake pads may be used with corresponding multiple pistons. Each brake pad 24 includes a block of friction material 26 bonded to a backing plate 28.

In operation, the bore 20 is slightly larger than the piston 22 so that a small gap 30 is formed around the piston 20 for piston clearance. As known, the caliper 16 is operatively coupled to a braking actuator that selectively controls the brake fluid within the bore 20 to move the piston 22 under hydraulic force and thus move the brake pad 24 toward the rotor 12.

Figure 4:
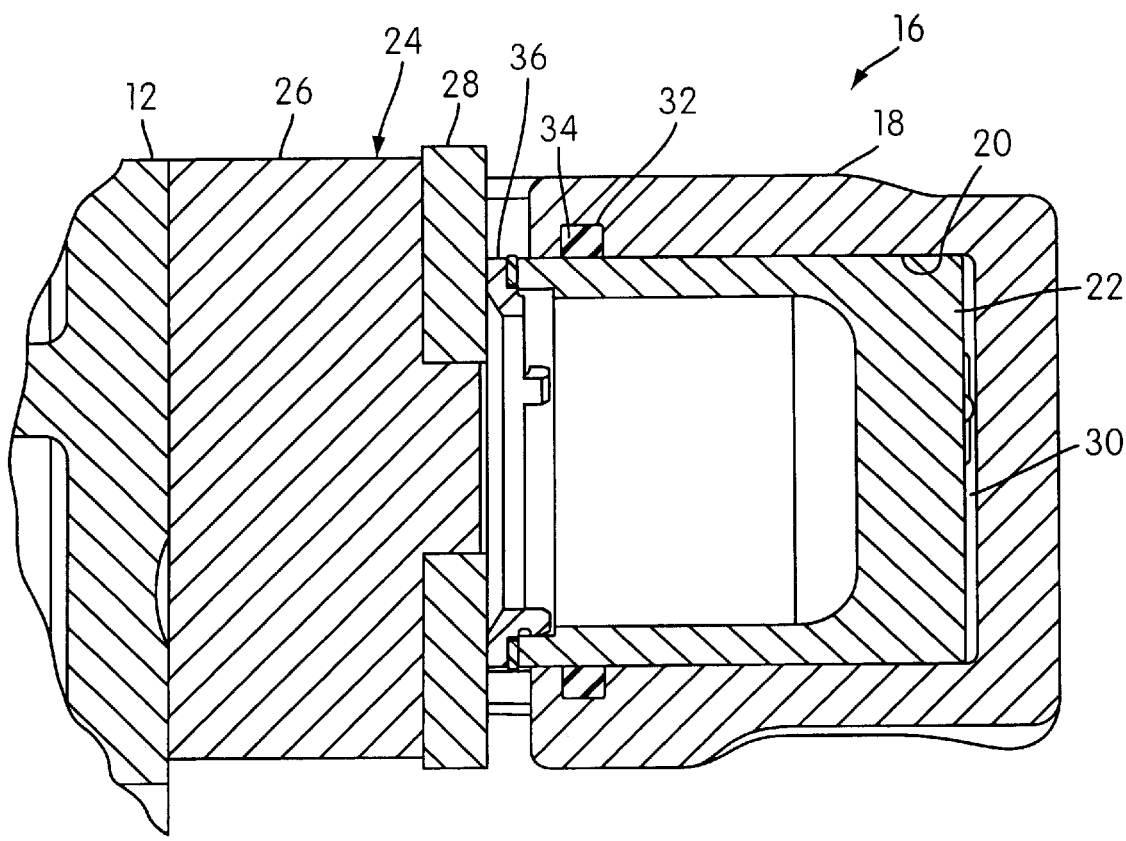
FIG. 4 is an enlarged partial view of section B from FIG. 3.
Figure 5A:
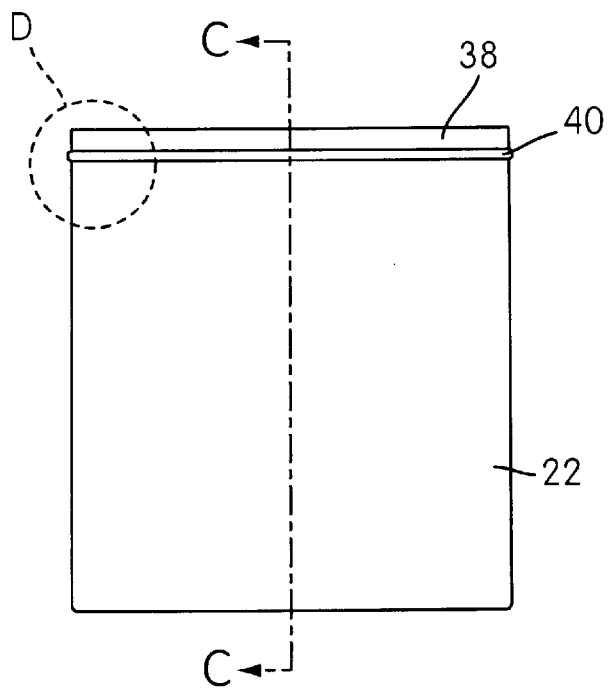
FIG. 5A is a side view of the piston and cap in accordance with the invention.
Figure 5B:
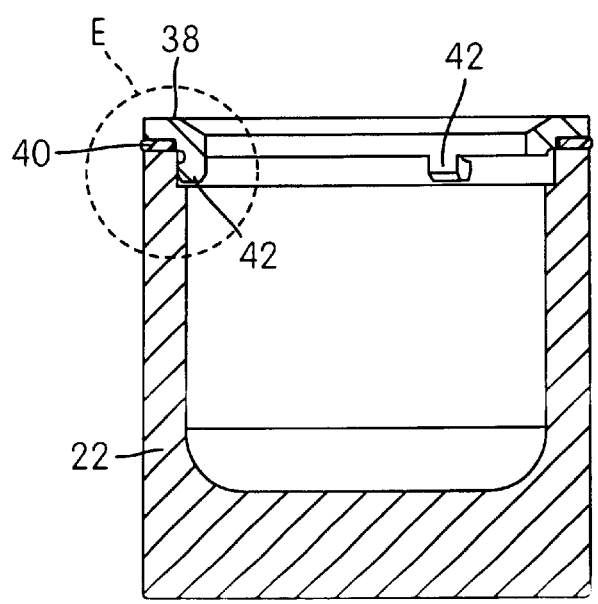
FIG. 5B is a cross section taken along line C—C of the piston of FIG. 5A.
Figure 6A:
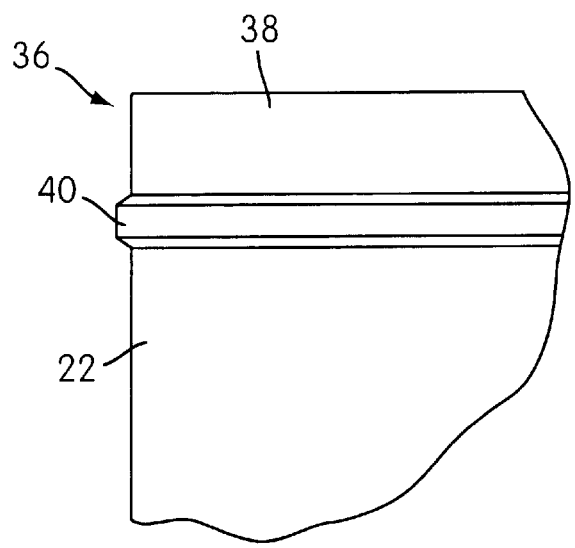
FIG. 6A is an enlarged partial view of section D of the piston and cap of FIG. 5A.
Figure 6B:
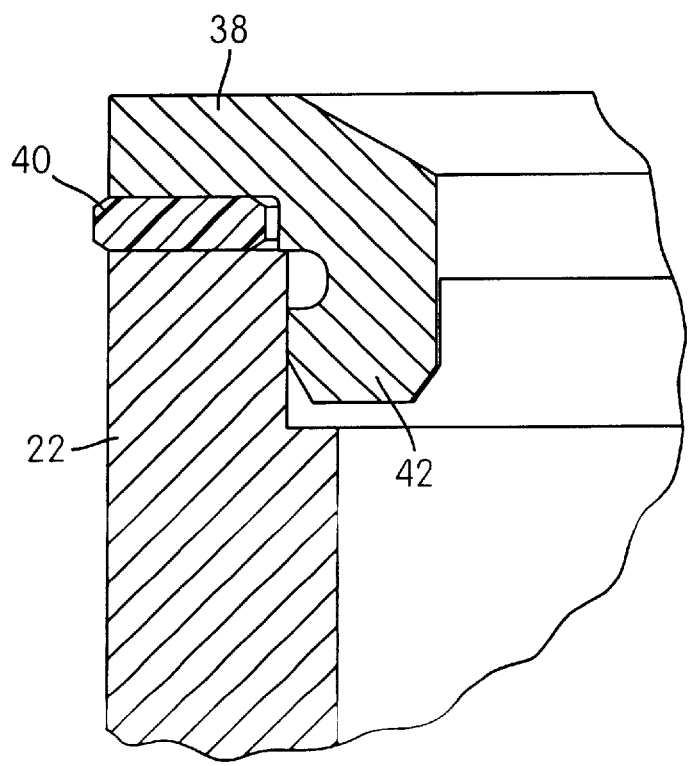
FIG. 6B is an enlarged partial view of section E of the piston and cap of FIG. 5B.
Figure 7A:
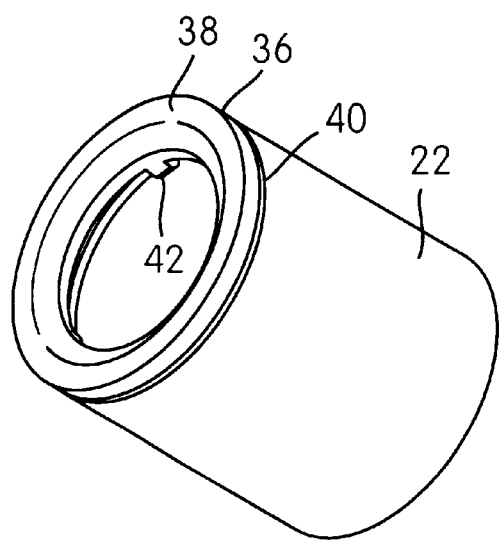
FIG. 7A is a perspective view of the piston and cap of FIG. 5A.
Figure 7B:
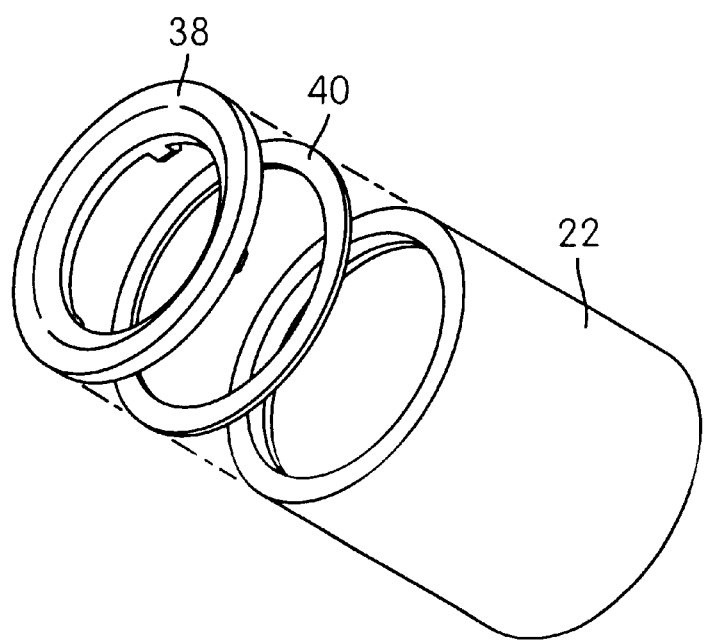
FIG. 7B is an exploded view of the piston and cap of FIG. 7A.
Figure 8A:
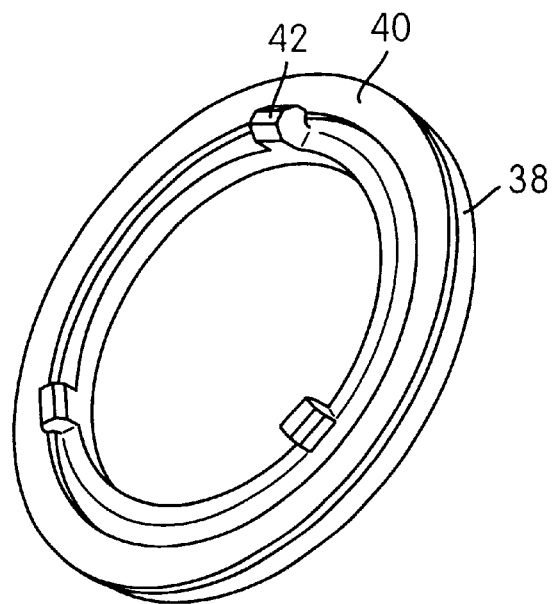
FIG. 8A is a perspective view of the cap assembly.
Figure 8B:
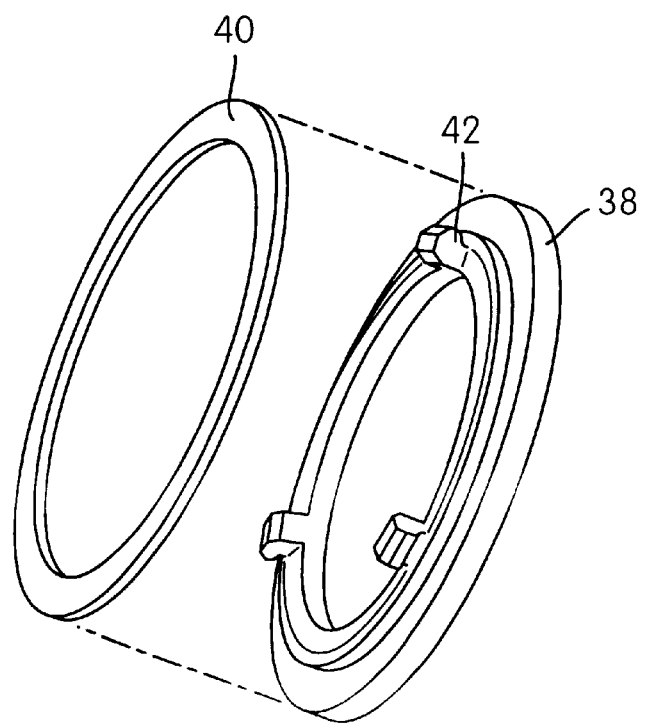
FIG. 8B is an exploded view of the cap assembly of FIG. 8A.
Figure 9A:
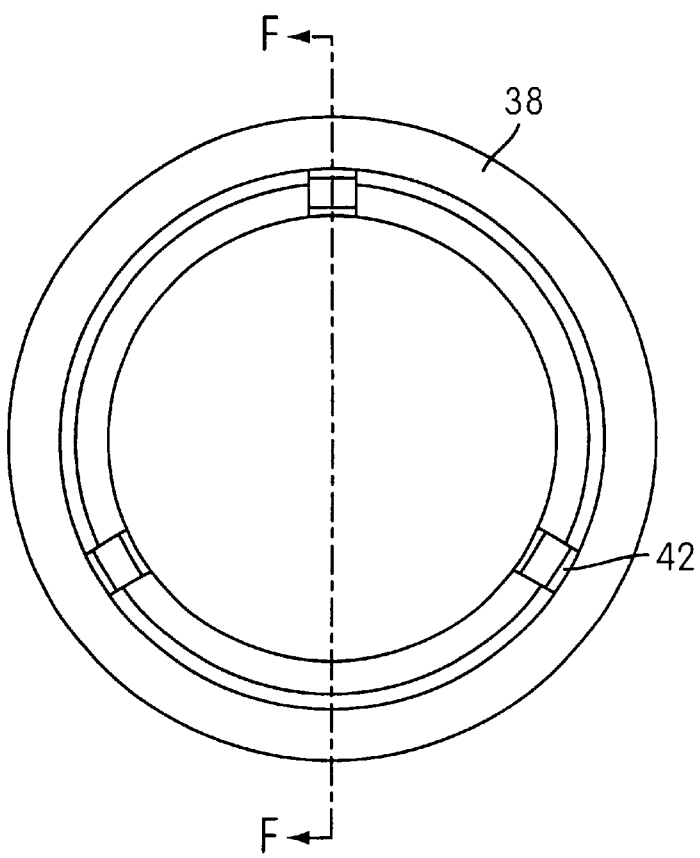
FIG. 9A is a bottom view of the cap assembly of FIG. 8A.
Figure 9B:
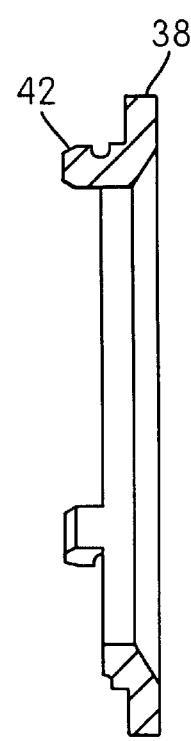
FIG. 9B is a side view in cross section of the cap assembly of FIG. 9A taken along line F—F.
Figure 10A:
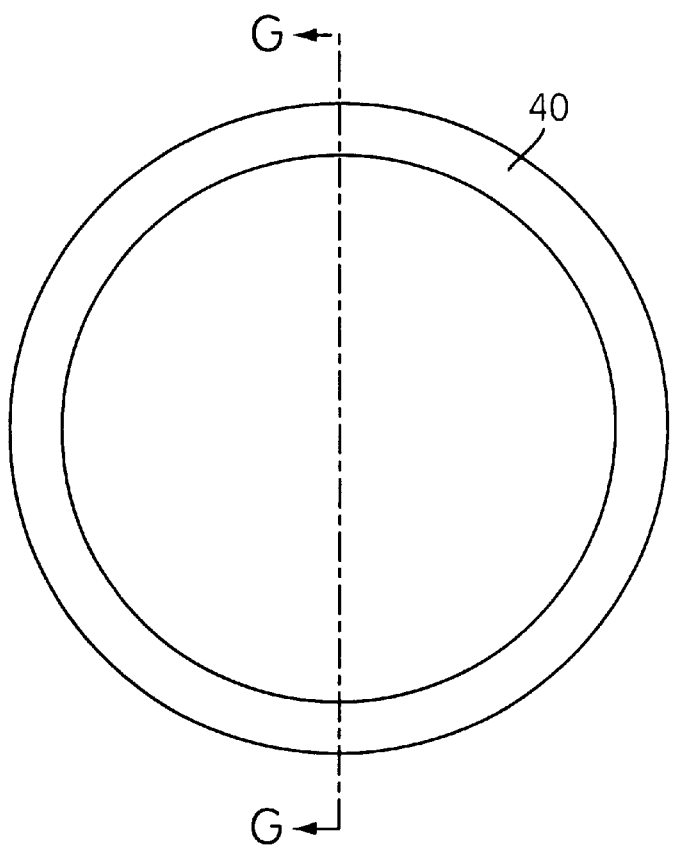
FIG. 10A is a top view of the seal.
Figure 10B:
FIG. 10B is a side view in cross section of the seal of FIG. 10A taken along line

FIG. 4 shows the caliper assembly 16 in more detail. The bore 20 has an annular groove 32 formed in the inner edge. The groove 32 retains a piston seal 34 that tightly surrounds the piston 22 under compression. The piston seal 34 seals the gap 30 around the piston 22 to prevent brake fluid from leaking from the caliper assembly 16. The piston seal 34 also retracts the piston 22 into the bore 20 after the braking force is removed. The piston 22 has a composite piston cap 36 press fit onto the top of the piston 22.

Referring to FIGS. 5A–10B, the piston 22 and the piston cap 36 are shown in more detail. The piston cap 36 preferably includes a cap piece 38, made of a strong material, such as steel, and an insulator 40. The insulator 40 is preferably in the form of a ring and is made of low thermally conductive material, such as a polymer. One suitable polymer is polyimide resin. Preferably, the insulator 40 does not conduct heat well, such as metal would, but instead has a conductivity of 2.0 W/min/° K. or less. More preferably, the insulator 40 has a conductivity of less than 0.5 W/min/° K. In one sample embodiment, the material used had a conductivity between about 0.2 and 0.5 W/min/° K.

As seen in FIGS. 6A, 6B, 7A and 7B, the insulator 40 is clamped between the cap piece 38 and the piston 22, thus creating a thermal break to inhibit heat transfer from the brake pad 24 to the piston 22 and caliper assembly 16.

As seen in FIGS. 8A, 8B, 9A, and 9B, the cap piece 38 has a plurality of discrete tabs 42 that extend within the piston 22 to clamp the composite cap 36 to the piston 22 by an interference fit. Any number or shape of tabs 42 can be used, including a single ring. The least number of tabs 42 possible to achieve a secure fit is preferred to minimize heat transfer between the cap piece 38 and the piston 22. It is also possible to use a spring to hold the cap in place if desired. Preferably, the tabs 42 are hooked to facilitate attachment and minimize heat transfer. The insulator 40 sits around the tabs 42.

The insulator 40 can also be a modified ring shape, as seen in FIGS. 11A–12B. As seen in FIGS. 11A and 11B, the insulator 44 is a ring with a slot 46 formed therein. As the insulator 44 can be susceptible to cracking due to stresses created in the ring, the slot 46 provides an initial break that alleviates stresses and minimizes additional cracking.

Figures 12A, 12B:
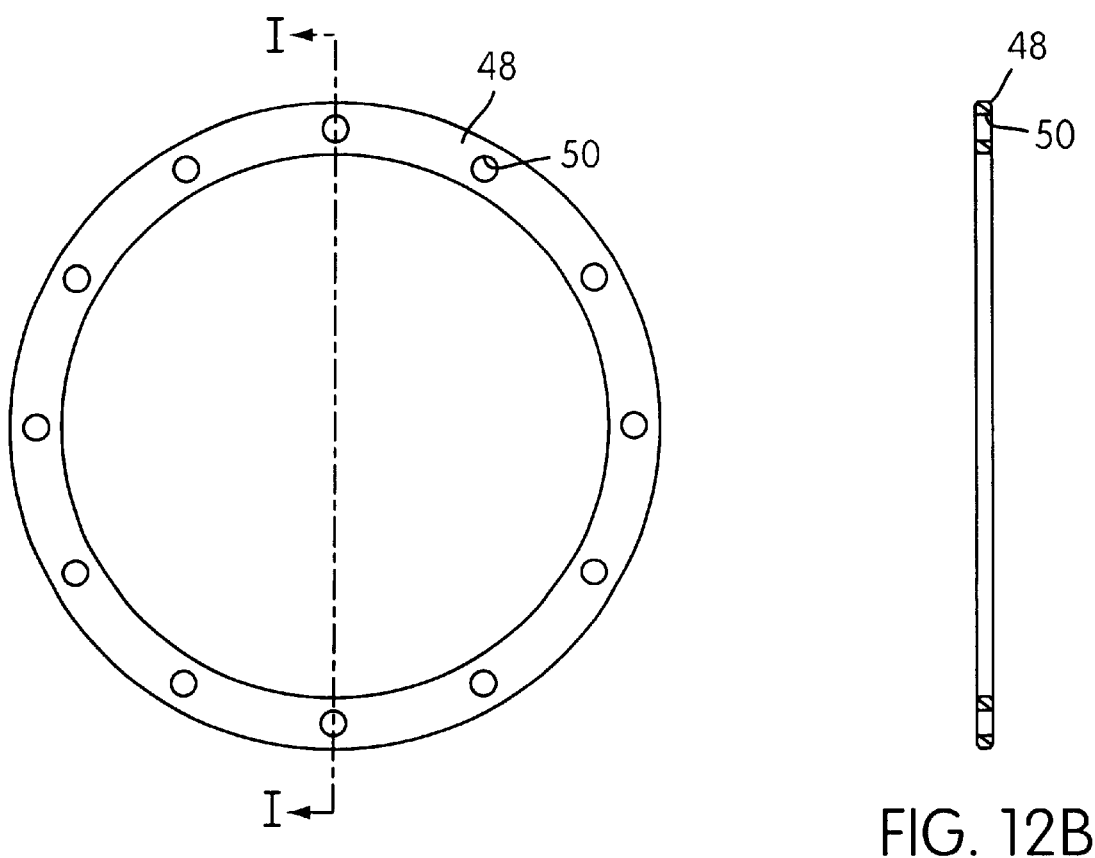
FIG. 12A is a top view of a modification of the seal.
FIG. 12B is a side view in cross section of the seal of FIG. 12A taken along line I—I.
Figure 13A:
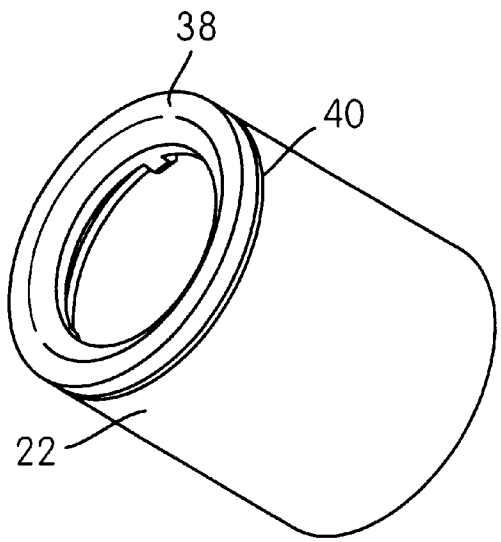
FIG. 13A is a perspective view of the piston and cap in accordance with a variation of the invention.
Figure 13B:
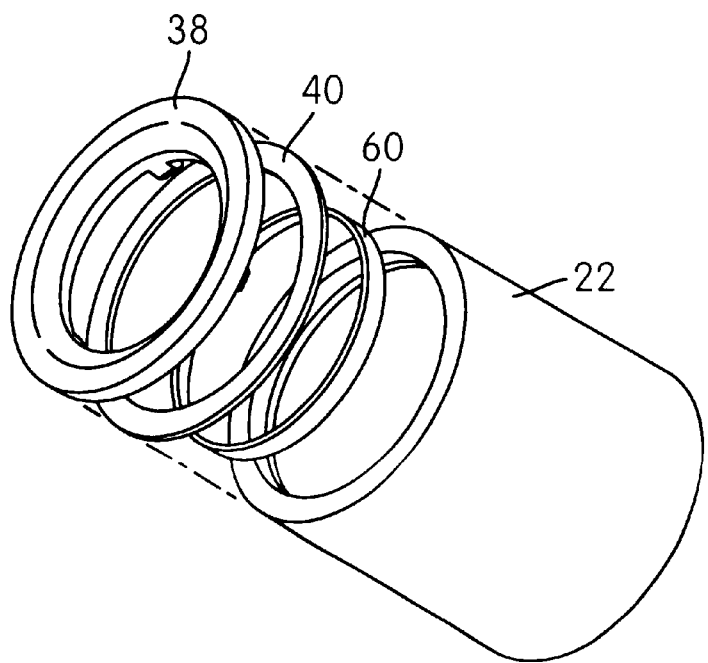
FIG. 13B is an exploded perspective view of the piston and cap of FIG. 13A.
Figure 14A:
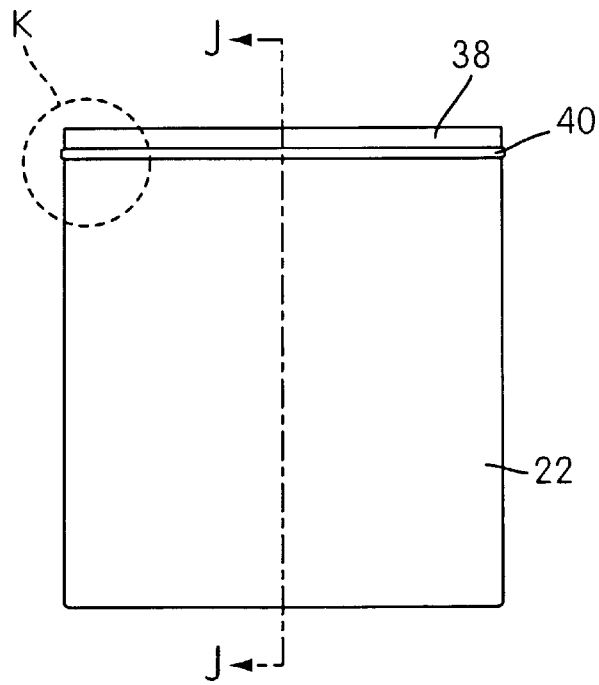
FIG. 14A is a side view of the piston and cap of FIG. 13A.
Figure 14B:
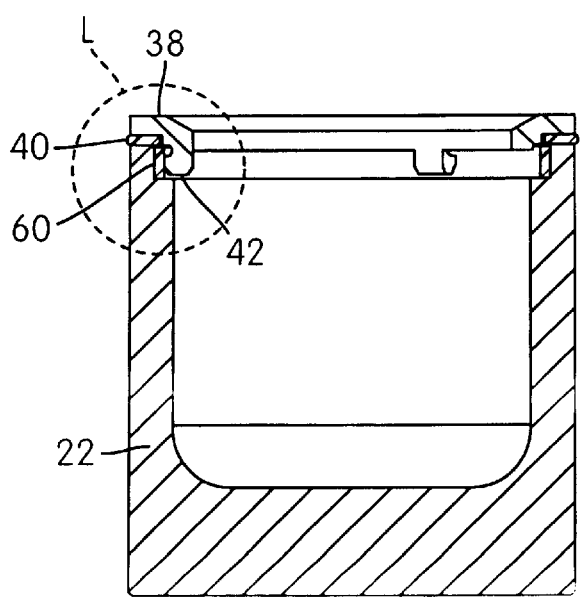
FIG. 14B is a side view in cross section of the piston and cap of FIG. 13A taken along line J—J.

FIGS. 12A and 12B show another modification of the insulator 48 in which a plurality of apertures 50 are formed in the ring. The apertures 50 reduce the contact area between the cap piece 38 and the piston 22, which further minimizes heat transfer.

The piston assembly shown in FIGS. 13A–16B show an additional insulator 60 that is retained within the piston 22 between the piston wall and the tabs 42. The insulator 60 is made of the same material as the insulator 40 and is also clamped between the cap piece 38 and the piston 22. Insulator 60 creates a thermal break between the tabs 42 and the piston 22 to provide an improved insulating effect. In the case where tabs 42 are formed as a continuous ring, insulator 66 is especially useful in creating an insulating effect. It would also be possible to form insulator 40 and insulator 60 in one piece or to form insulator 40 with insulator tabs instead of a ring 60.

Figure 15A:
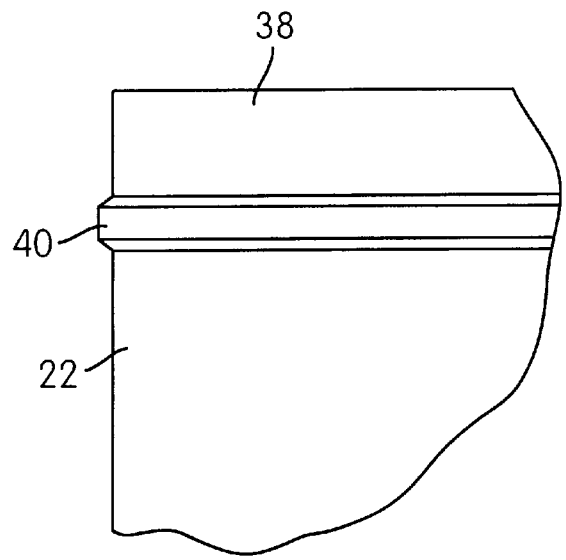
FIG. 15A is a partial enlarged view of section K of the piston and cap of FIG. 14A.
Figure 15B:
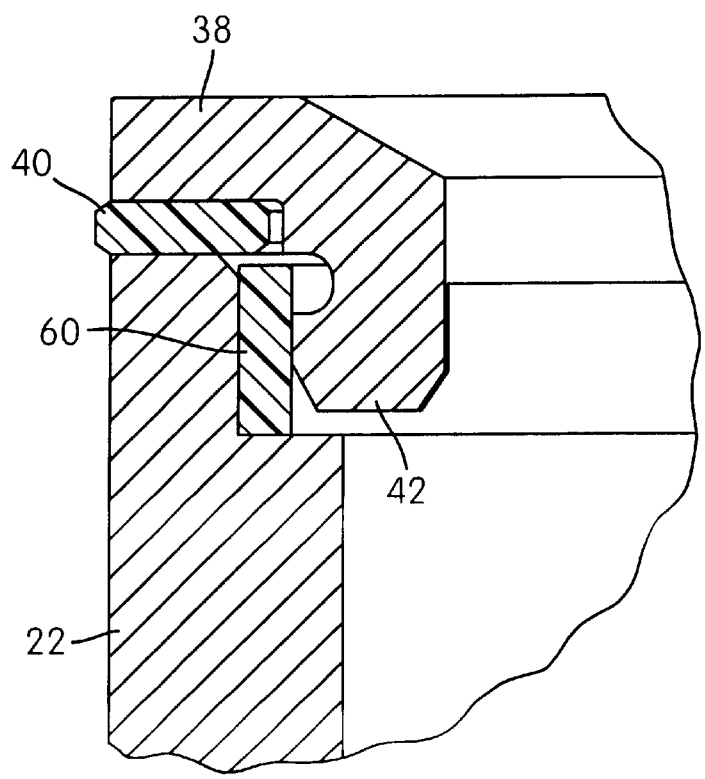
FIG. 15B is a partial enlarged view of section L of the piston and cap of FIG. 14B.
Figures 16A, 16B:
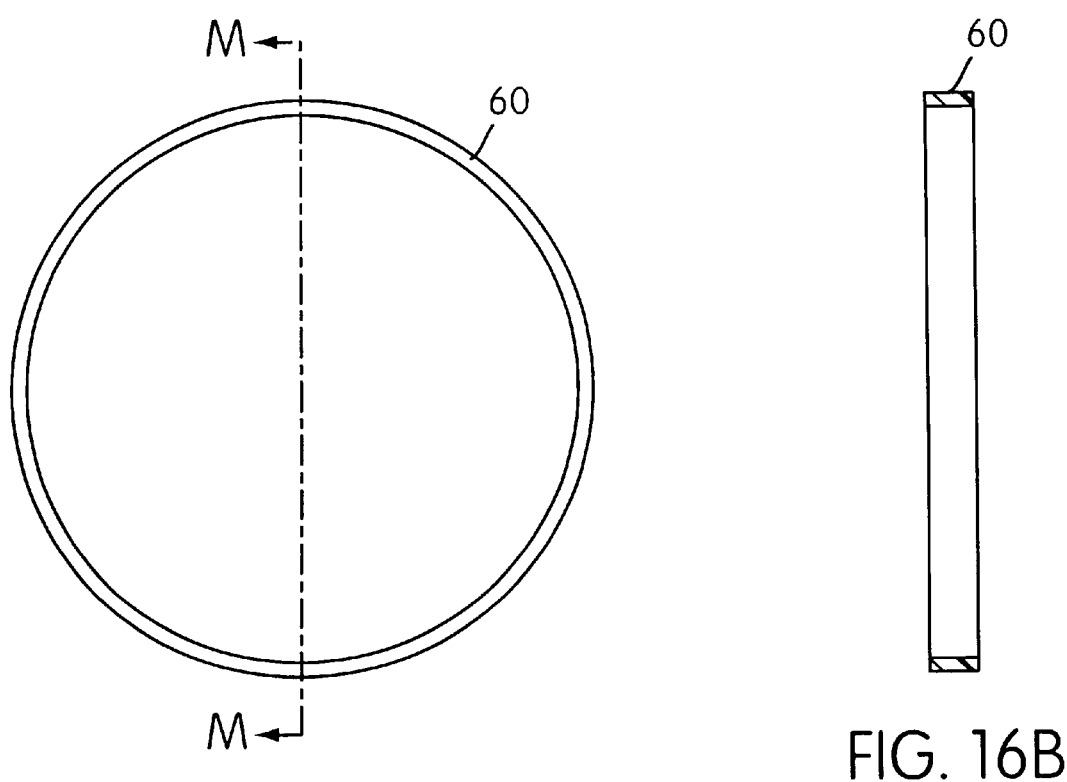
FIG. 16A is a top view of the seal of the piston and cap assembly of FIG. 15B.
FIG. 16B is a side view in cross section taken along line M—M of the seal of FIG. 16A.
Figure 17A:
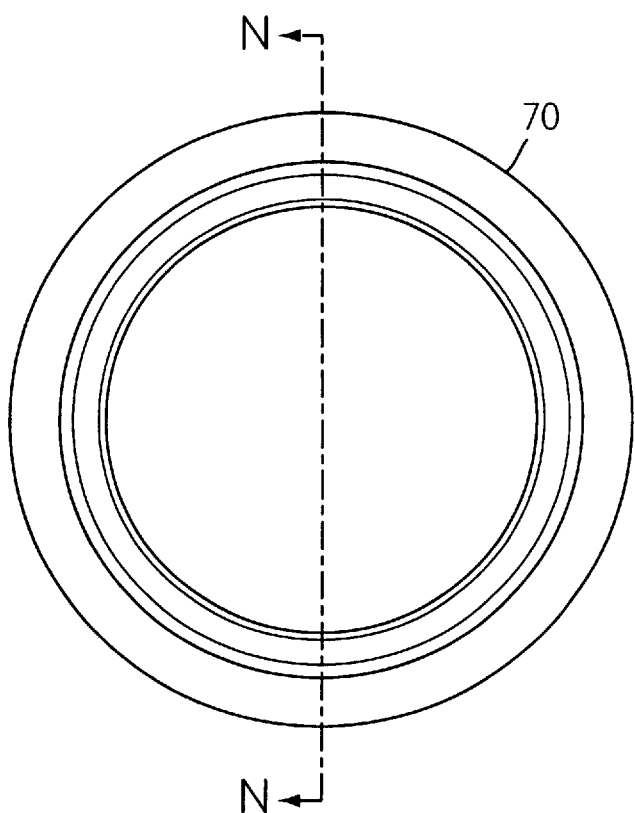
FIG. 17A is a top view of the cap in accordance with another embodiment of the invention.
Figure 17B:
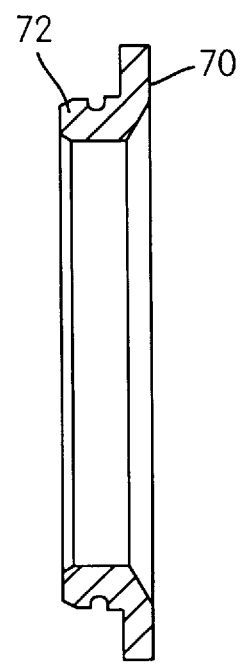
FIG. 17B is a side view in cross section of the cap of FIG. 17A taken along line N—N.

FIGS. 17A and 17B show a modification of the cap piece 70 that has an annular flange 72, instead of tabs. As seen in FIG. 17B, the outer surface of the flange 72 is hooked to facilitate assembly in a piston bore. This configuration with the annular flange 72 has manufacturing advantages. In this case, it would be preferable to use an additional insulating ring 60, as seen in FIG. 15B, for example. A one piece insulator could also be used with this design.

Figure 18A:
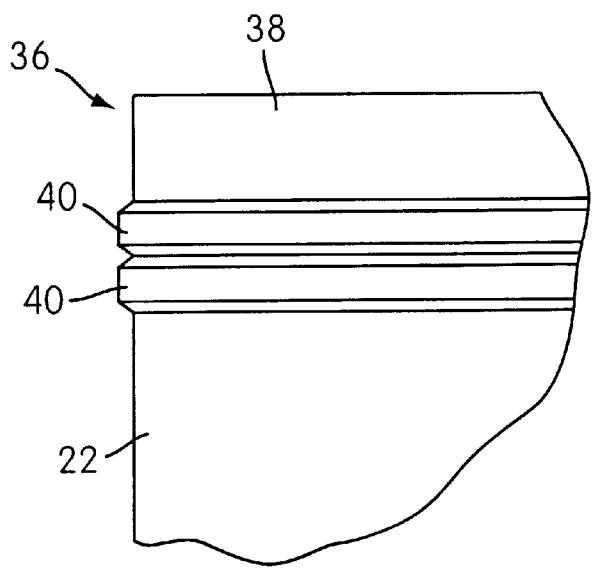
FIG. 18A is a side view of a piston and cap in accordance with a further modification of the invention.
Figure 18B:
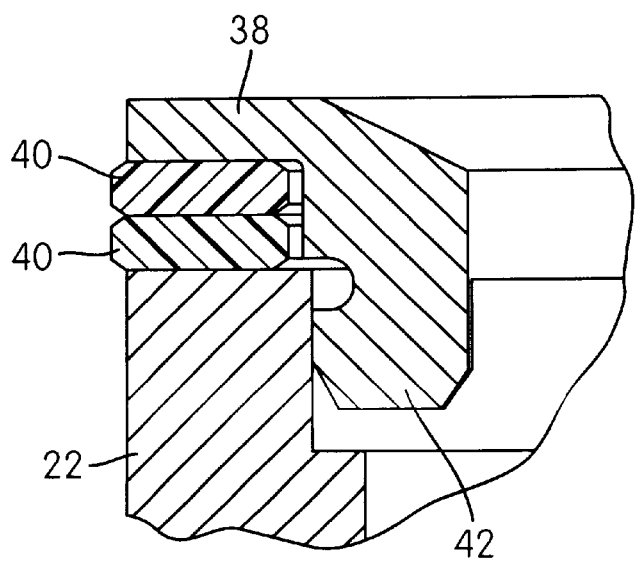
FIG. 18B is a side view in cross section of the piston and cap of FIG. 18A.

FIGS. 18A and 18B show an assembly in which multiple insulators 40 are clamped between the cap piece 38 and the piston 22. This arrangement enhances the insulation effect by creating a larger thermal barrier between the piston cap 36 and the piston 22. Although two insulators 40 are shown, any number of insulators 40 can be used. Further, insulators 40 are shown having approximately the same thickness. However, insulators having different thickness may be used, to balance strength, cost and insulating properties for example.

Figure 19A:
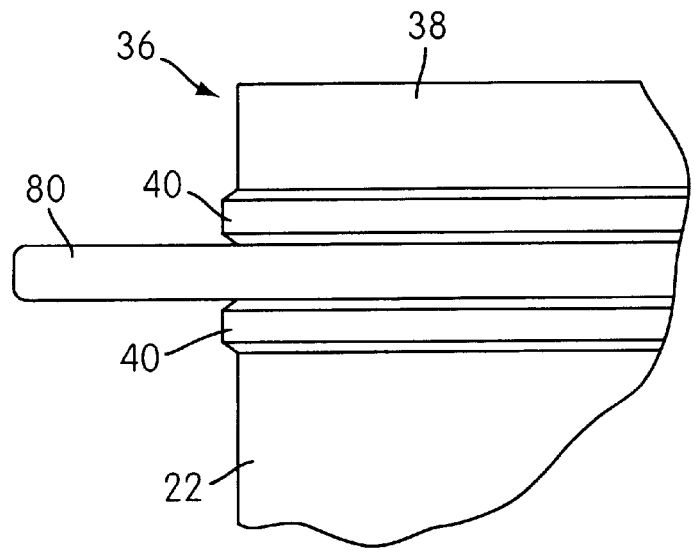
FIG. 19A is a side view of a piston and cap in accordance with another modification of the invention.
Figure 19B:
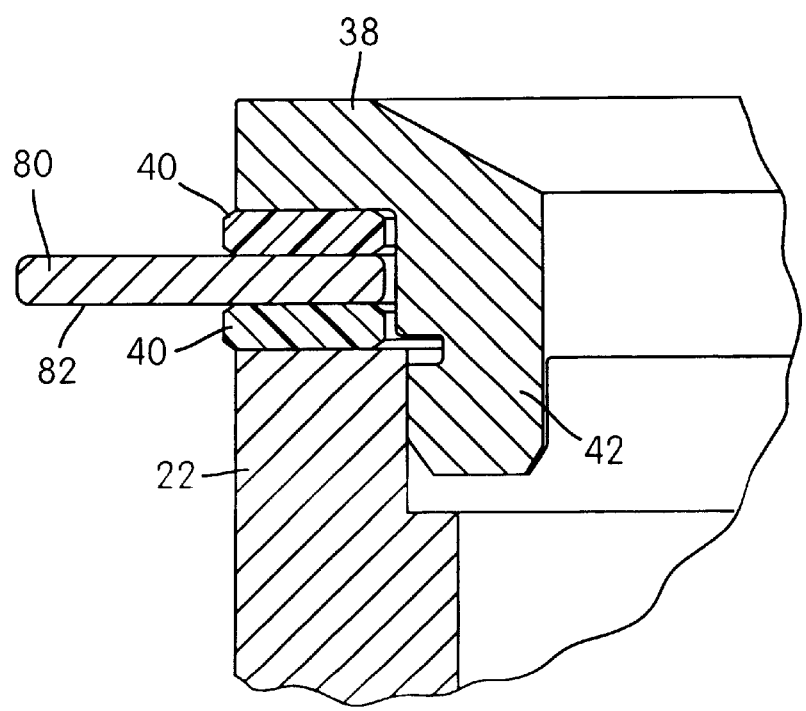
FIG. 19B is a side view in cross section of the piston and cap of FIG. 19A.

FIGS. 19A and 19B show an assembly in which multiple insulators 40 are used with a high conduction radiator shim 80 disposed between the insulators 40. In this case, shim 80 has opposed surfaces 82 with a larger diameter than insulators 40 so as to present a pair of opposed radiating surfaces 82 to the environment surrounding the caliper assembly 16. The shim 80 can be made of any high conductive material, including but not limited to copper and aluminum. By this arrangement, heat that is transferred from the piston cap 36 to the insulator 40 and is then conducted through the shim 80 to surfaces 82. Heat from surfaces 82 is dissipated into the surrounding environment for an additional insulating effect.

It will be understood that the embodiments disclosed herein are illustrative only and that the invention encompasses modifications and changes to the particular design features.

What is claimed is:

1. A piston for use with a brake caliper, comprising:
   a piston body having an end;
   a cap piece secured to the end of the piston body, wherein the cap piece has a flange that extends into the piston body and secures the cap piece onto the piston body; and
   an insulator having low thermal conductivity disposed between the cap piece and the piston body, wherein the insulator is a ring clamped between the cap piece and the end of the piston body.

2. The piston of claim 1, wherein the piston body and the cap piece are made of metal.

3. The piston of claim 1, wherein the insulator is made of a polymer.

4. The piston of claim 3, wherein the polymer is polyimide resin.

5. The piston of claim 1, wherein the insulator has a conductivity of 0.5 W/m/° K. or less.

6. The piston of claim 1, wherein the insulator includes plural rings.

7. The piston of claim 1, wherein the flange of the cap piece includes a plurality of tabs that extend into the piston body and secure the cap piece onto the piston body.

8. The piston of claim 7, wherein the insulator further includes a second ring disposed between the tabs and the piston.

9. The piston of claim 1, wherein the flange is annular.

10. The piston of claim 1, wherein the insulator further includes a second ring disposed between the flange and the piston.

11. The piston of claim 1, wherein the insulator has a slot therein.

12. The piston of claim 1, wherein the insulator has a plurality of apertures therein.

13. A piston for use with a brake caliper, comprising:
    a piston body;
    a cap piece secured to an end of the piston body; and
    an insulator having low thermal conductivity disposed between the cap piece and the piston body, wherein the insulator includes a first ring disposed on an end of the piston and a second ring disposed in a bore in the piston perpendicular to the first ring.

14. A piston for use with a brake caliper, comprising:
    a piston body;
    a cap piece secured to an end of the piston body; and
    an insulator having low thermal conductivity disposed between the cap piece and the piston body, further comprising a radiator shim disposed between the cap piece and the piston body adjacent to the insulator, wherein the radiator shim extends outwardly beyond the insulator and has a surface adapted to transfer heat to the environment.

15. The piston of claim 14, wherein the insulator includes a pair of rings and the radiator shim is clamped between the rings.

16. A brake caliper comprising:
    a caliper body configured to surround an edge of a rotor, wherein the caliper body includes at least one bore;
    a piston slidably retained in the at least one bore and having a hollow end protruding from the bore; and
    a composite cap secured to the end of the piston, wherein the cap includes a cap piece having an integral attachment element that couples the cap piece to the piston within the hollow end and an insulator disposed between the cap piece and the piston.

17. The brake caliper of claim 16, wherein the insulator has a conductivity of 0.5 W/m/° K. or less.

18. The brake caliper of claim 16, wherein the cap piece is made of metal, the piston is made of metal, and the insulator is made of polymer.

19. The brake caliper of claim 18, wherein the insulator is made of polyimide resin.

20. The brake caliper of claim 16, further comprising a radiator shim disposed between the cap piece and the piston adjacent to the insulator, wherein the radiator shim extends outwardly beyond the insulator and has a surface adapted to transfer heat to the environment.

21. The brake caliper of claim 16, wherein the insulator is a ring clamped between the cap piece and the piston to create a thermal break.

22. The brake caliper of claim 21, wherein the insulator includes a second ring clamped between the attachment element and the piston.

23. The brake caliper of claim 21, wherein the insulator includes a second ring clamped between the cap piece and the piston.

24. A disc brake assembly, comprising:

- a rotor including a disc and an attachment portion that is configured for attachment to a wheel hub;
- at least one pair of brake pads mounted adjacent to the caliper on either side of the rotor for selective engagement with the rotor; and
- a brake caliper mounted adjacent to the rotor so as to surround an edge of the rotor, wherein the brake caliper includes at least one piston slidably mounted adjacent the brake pads to selectively actuate movement of the brake pads toward the rotor, and wherein each piston has a piston cap having a metallic cap piece secured to the piston and a thermal insulator formed as a thin ring made of polymer disposed between the cap piece and the piston.

25. The disc brake assembly of claim 24, wherein the insulator has a conductivity of 0.5 W/m/° K. or less.

26. The disc brake assembly of claim 24, wherein the insulator includes plural rings.

27. The disc brake assembly of claim 24, in combination with a vehicle.

* * * * *